United States Patent
Mejia et al.

(10) Patent No.: US 9,384,351 B2
(45) Date of Patent: Jul. 5, 2016

(54) METHOD AND APPARATUS FOR IMPLEMENTING A SECURE BOOT USING MULTIPLE FIRMWARE SOURCES

(71) Applicants: Ivan Herrera Mejia, Folsom, CA (US); Kenneth D. Shoemaker, Los Altos Hills, CA (US)

(72) Inventors: Ivan Herrera Mejia, Folsom, CA (US); Kenneth D. Shoemaker, Los Altos Hills, CA (US)

(73) Assignee: Intel Corporation, Santa Clara, CA (US)

( * ) Notice: Subject to any disclaimer, the term of this patent is extended or adjusted under 35 U.S.C. 154(b) by 310 days.

(21) Appl. No.: 13/839,892

(22) Filed: Mar. 15, 2013

(65) Prior Publication Data

US 2014/0281456 A1    Sep. 18, 2014

(51) Int. Cl.
*G06F 21/00* (2013.01)
*G06F 21/57* (2013.01)
*H01L 27/112* (2006.01)

(52) U.S. Cl.
CPC .......... *G06F 21/575* (2013.01); *G06F 21/572* (2013.01); *H01L 27/11206* (2013.01)

(58) Field of Classification Search
CPC ..... G06F 9/4401; G06F 9/4403; G06F 21/10; G06F 21/78; G06F 21/79; G06F 21/123; G06F 21/572; G06F 21/575; H04L 9/0816; H04L 9/0822; H01L 27/11206
See application file for complete search history.

(56) References Cited

U.S. PATENT DOCUMENTS

| | | | |
|---|---|---|---|
| 2008/0082828 A1* | 4/2008 | Jennings et al. | 713/176 |
| 2009/0136041 A1* | 5/2009 | Tsu | 380/278 |
| 2013/0019058 A1* | 1/2013 | Caraccio et al. | 711/103 |
| 2013/0031374 A1* | 1/2013 | Thom et al. | 713/189 |
| 2013/0054946 A1* | 2/2013 | Thom et al. | 713/2 |
| 2013/0124840 A1* | 5/2013 | Diluoffo et al. | 713/2 |
| 2014/0066015 A1* | 3/2014 | Aissi | 455/411 |
| 2014/0086406 A1* | 3/2014 | Polzin et al. | 380/44 |

* cited by examiner

*Primary Examiner* — Dennis M Butler
(74) *Attorney, Agent, or Firm* — Lowenstein Sandler LLP

(57) ABSTRACT

Technologies for implementing a secure boot using multiple firmware sources are described. One or more fuses of a processing device can be configured. Based on such configuration, one or more keys can be generated. Based on the configuration of the various fuses, an operation of a firmware device can be initiated. Using the generated key(s), a protected section of the firmware device can be accessed.

20 Claims, 16 Drawing Sheets

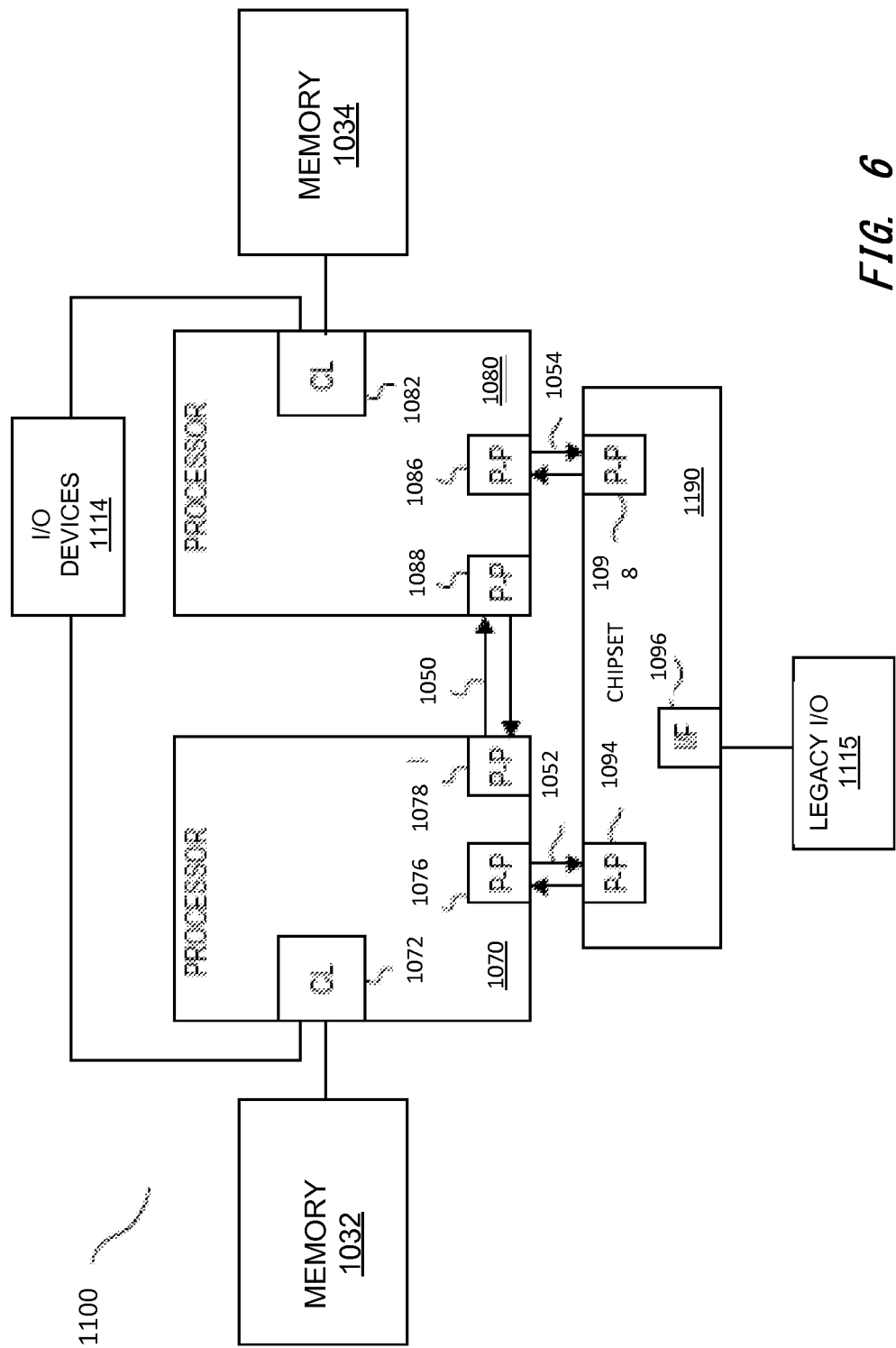

METHOD AND APPARATUS FOR IMPLEMENTING A SECURE BOOT USING MULTIPLE FIRMWARE SOURCES

TECHNICAL FIELD

Embodiments described herein generally relate to processing devices and, more specifically, relate to selecting runtime firmware.

BACKGROUND

Various data processors can be configured to receive the firmware necessary for the operation of a particular device from a limited number of sources. For device manufacturers wishing to implement such processor(s) within a device, such configurations can restrict or limit various other design options. For example, currently, certain processors can only receive runtime firmware from a limited number of interfaces or memory types. Accordingly, device manufacturers wishing to implement such processor(s) cannot utilize other interfaces or memory types during boot which may provide other advantages or efficiencies.

BRIEF DESCRIPTION OF THE DRAWINGS

FIG. 6 is a block diagram of a computer system according to one embodiment.

DESCRIPTION OF EMBODIMENTS

Figure 1A:
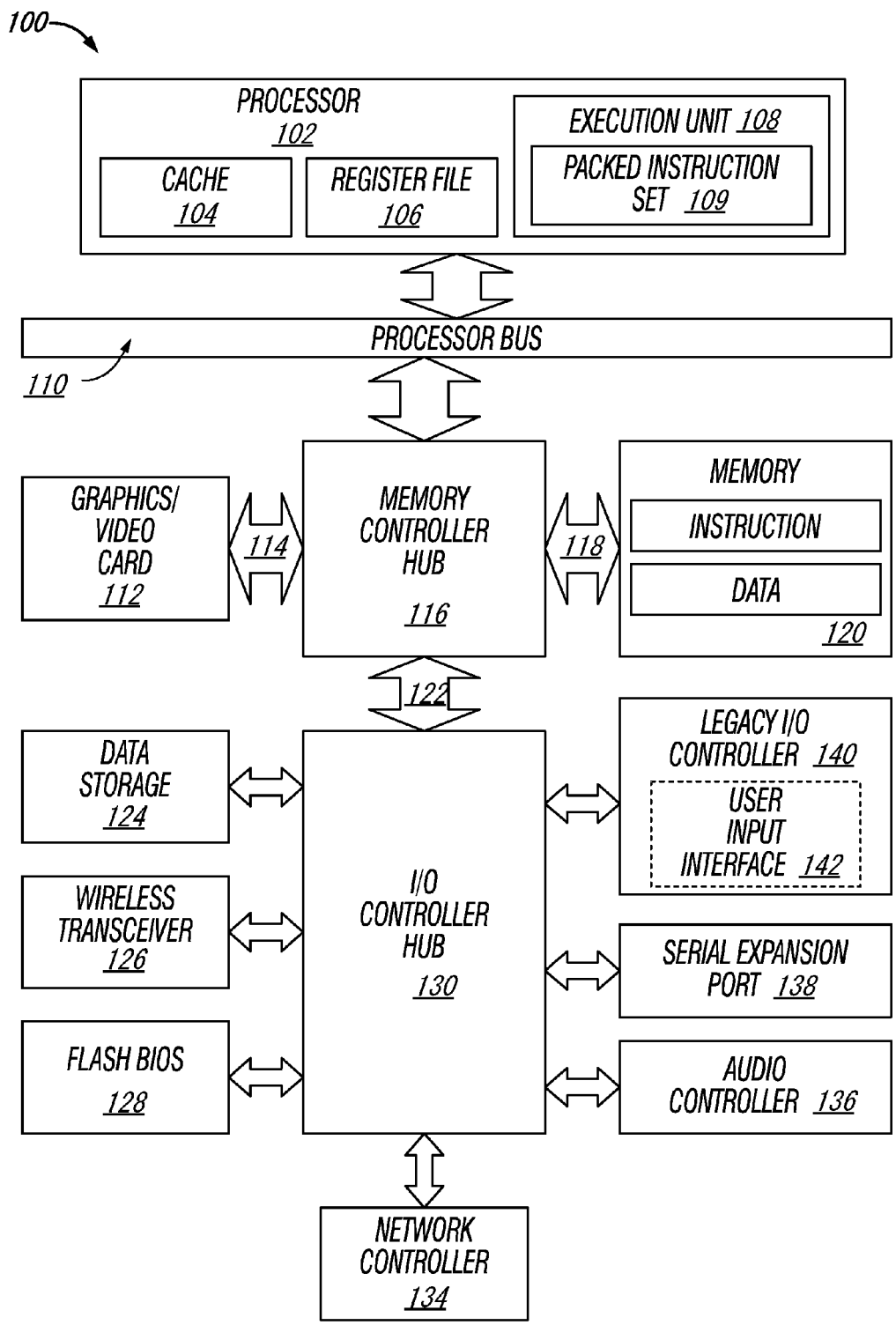
FIG. 1A is a block diagram of one embodiment of a system for selecting a runtime firmware.

Technologies for implementing a secure boot using multiple firmware sources are described. One or more fuses of a processing device can be configured. Based on such configuration, one or more keys, such as a Replay Protected Memory Block (RPMB) key, can be generated. Moreover, based on the configuration of the various fuses, an operation of a firmware device, such as a flash memory or mass storage device, can be initiated. Using the generated key(s), a protected section of the firmware device (containing the firmware) can be accessed. The firmware can be requested from the firmware device, and subsequently executed by the processing device.

In doing so, device manufacturers, such as mobile device (e.g., smartphone) manufacturers can implement such processing devices in a manner than enables the utilization of any number of interfaces and memory types during boot, providing flexibility not attainable using prior technologies on a number of levels including cost, performance, and design.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice embodiments of the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to firmware selection in computing platforms or microprocessors, other embodiments are applicable to other types of integrated circuits and logic devices. Similar techniques and teachings of embodiments described herein may be applied to other types of circuits or semiconductor devices that may also benefit from better firmware selection. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones ('smartphones'), Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency.

Although the following embodiments are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the invention. In one embodiment, functions associated with embodiments of the present disclosure are embodied in machine-executable instructions. The instructions can be used to cause a general-purpose or special-purpose processor that is programmed with the instructions to perform the operations of embodiments of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In modern processors, a number of different execution units are used to process and execute a variety of code and instructions. Not all instructions are created equal as some are quicker to complete while others can take a number of clock cycles to complete. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that can logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type are referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data are generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

Turning to FIG. 1A, a block diagram of an exemplary computer system formed with a processor that includes execution units to execute an instruction, where one or more of the interconnects implement one or more features in accordance with one embodiment of the present disclosure is illustrated. System 100 includes a component, such as a processor 102 to employ execution units including logic to perform algorithms for process data, in accordance with embodiments of the present disclosure. System 100 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 102 includes one or more execution units 108 to implement an algorithm that is to perform at least one instruction. One embodiment may be described in the context of a single processor desktop or server system, but alternative embodiments may be included in a multiprocessor system. System 100 is an example of a 'hub' system architecture. The computer system 100 includes a processor 102 to process data signals. The processor 102, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that transmits data signals between the processor 102 and other components in the system 100. The elements of system 100 (e.g. graphics accelerator 112, memory controller hub 116, memory 120, I/O controller hub 124, wireless transceiver 126, Flash BIOS 128, Network controller 134, Audio controller 136, Serial expansion port 138, I/O controller 140, etc.) perform their conventional functions that are well known to those familiar with the art.

In one embodiment, the processor 102 includes a Level 1 (L1) internal cache memory 104. Depending on the architecture, the processor 102 may have a single internal cache or multiple levels of internal caches. Other embodiments include a combination of both internal and external caches depending on the particular implementation and needs. Register file 106 is to store different types of data in various registers including integer registers, floating point registers, vector registers, banked registers, shadow registers, checkpoint registers, status registers, and instruction pointer register.

Execution unit 108, including logic to perform integer and floating point operations, also resides in the processor 102. The processor 102, in one embodiment, includes a microcode (ucode) ROM to store microcode, which when executed, is to perform algorithms for certain macroinstructions or handle complex scenarios. Here, microcode is potentially updateable to handle logic bugs/fixes for processor 102. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 108 may also be used in micro controllers, embedded processors, graphics devices, DSPs, and other types of logic circuits. System 100 includes a memory 120. Memory 120 includes a dynamic random access memory (DRAM) device, a static random access memory (SRAM) device, flash memory device, or other memory device. Memory 120 stores instructions and/or data represented by data signals that are to be executed by the processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 1B:
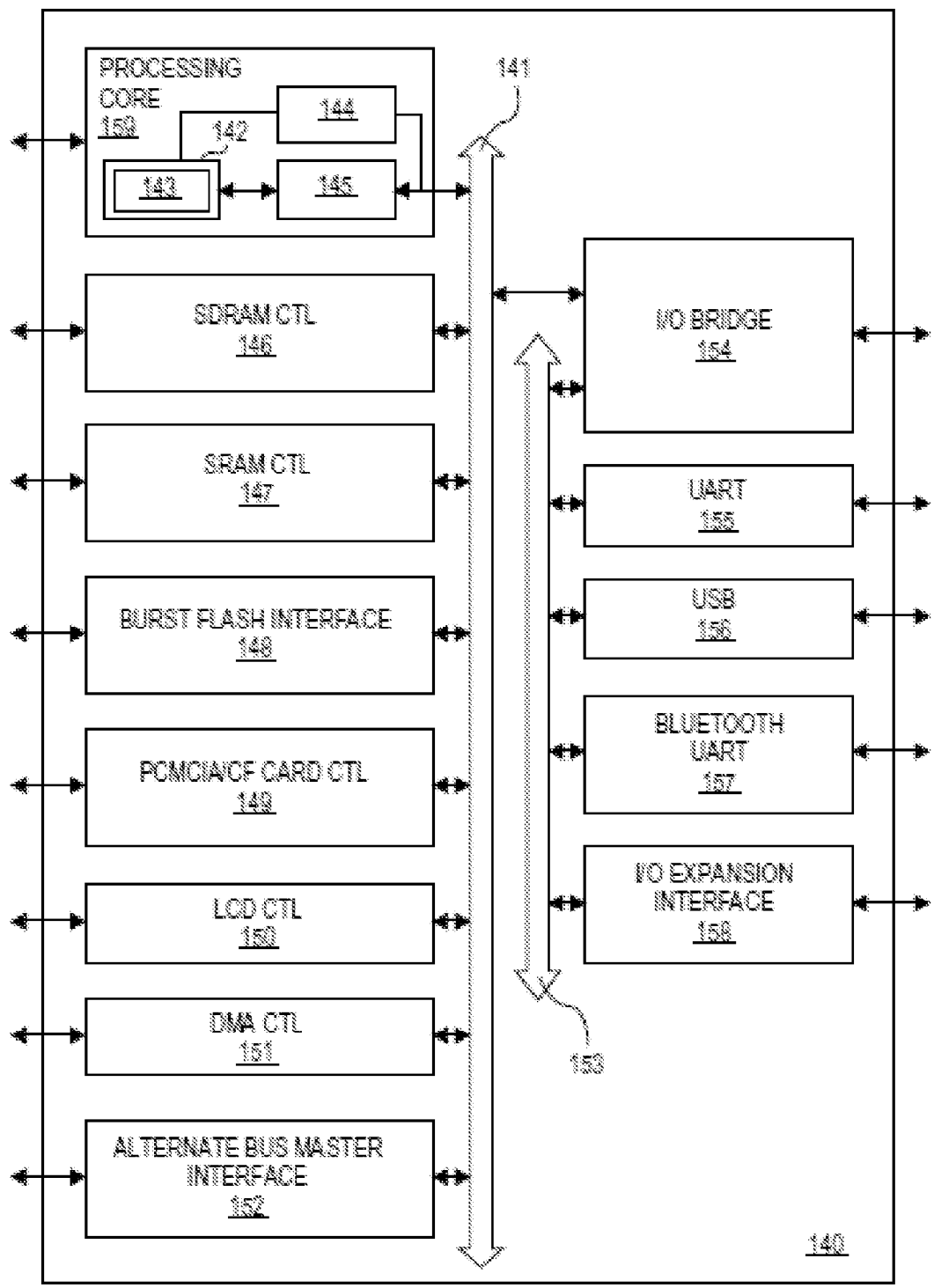
FIG. 1B is a block diagram of one embodiment of a system for selecting a runtime firmware.

FIG. 1B illustrates a data processing system 140 which implements the principles of one embodiment of the present disclosure. It will be readily appreciated by one of skill in the art that the embodiments described herein can be used with alternative processing systems without departure from the scope of embodiments of the invention.

Computer system 140 comprises a processing core 159 capable of performing at least one instruction in accordance with one embodiment. For one embodiment, processing core 159 represents a processing unit of any type of architecture, including but not limited to a CISC, a RISC or a VLIW type architecture. Processing core 159 may also be suitable for manufacture in one or more process technologies and by being represented on a machine readable media in sufficient detail, may be suitable to facilitate said manufacture.

Processing core 159 comprises an execution unit 142, a set of register file(s) 145, and a decoder 144. Processing core 159 also includes additional circuitry (not shown) which is not necessary to the understanding of embodiments of the present disclosure. Execution unit 142 is used for executing instructions received by processing core 159. In addition to performing typical processor instructions, execution unit 142 can perform instructions in packed instruction set 143 for performing operations on packed data formats. Packed instruction set 143 includes instructions for performing embodiments of the present technologies and other packed instructions. Execution unit 142 is coupled to register file 145 by an internal bus. Register file 145 represents a storage area on processing core 159 for storing information, including data. As previously mentioned, it is understood that the storage area used for storing the packed data is not critical. Execution unit 142 is coupled to decoder 144. Decoder 144 is used for decoding instructions received by processing core 159 into control signals and/or microcode entry points. In response to these control signals and/or microcode entry points, execution unit 142 performs the appropriate operations. In one embodiment, the decoder is used to interpret the opcode of the instruction, which will indicate what operation should be performed on the corresponding data indicated within the instruction.

Processing core 159 is coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 capable of performing SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
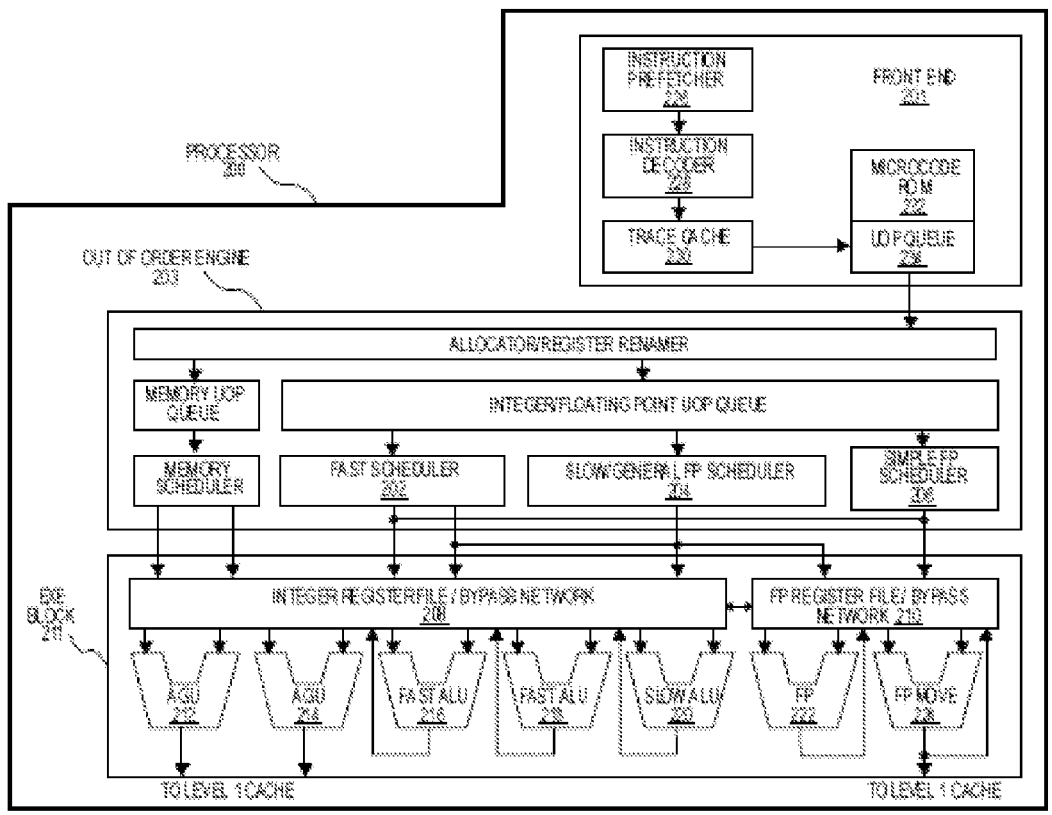
FIG. 1C is a block diagram of a processor according to one embodiment.

FIG. 1C illustrates a block diagram of the micro-architecture for a processor 200 that includes logic circuits to perform firmware selection in accordance with one embodiment of the present disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 201 is the part of the processor 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete an instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to a entry point programmable logic array (PLA) to determine a correct micro-instruction pointer for reading the micro-code sequences to complete one or more instructions in accordance with one embodiment from the micro-code ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206, determine when a uop is ready to execute based on the readiness of their dependent input register operand sources and the availability of the execution resources the uops need to complete their operation. The fast scheduler 202 of one embodiment can schedule on each half of the main clock cycle while the other schedulers can only schedule once per main processor clock cycle. The schedulers arbitrate for the dispatch ports to schedule uops for execution.

Register files 208, 210, sit between the schedulers 202, 204, 206, and the execution units 212, 214, 216, 218, 220, 222, 224 in the execution block 211. There is a separate register file 208, 210, for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. For embodiments of the present disclosure, instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220, are described in the context of performing integer operations on 64 bit data operands. In alternative embodiments, the ALUs 216, 218, 220, can be implemented to support a variety of data bits including 16, 32, 128, 256, etc. Similarly, the floating point units 222, 224, can be implemented to support a range of operands having bits of various widths. For one embodiment, the floating point units 222, 224, can operate on 128 bits wide packed data operands in conjunction with SIMD and multimedia instructions.

In one embodiment, the uops schedulers 202, 204, 206, dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

In one embodiment, processor 200 also includes logic to implement firmware selection according to embodiments of the present technologies. In other embodiments, processing device 200 may include hardware circuitry to provide firmware selection according to at least one embodiment.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

An in-order pipeline and a register renaming stage, out-of-order issue/execution pipeline can be implemented according to at least one embodiment of the present technologies. An in-order architecture core and a register renaming logic, out-of-order issue/execution logic can be included in a processor according to at least one embodiment of the present technologies.

A processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

A processor core 490 can include a front end unit 430 coupled to an execution engine unit 450, and both are coupled to a memory unit 470.

The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to a level 2 (L2) cache unit 476 in the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 162 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
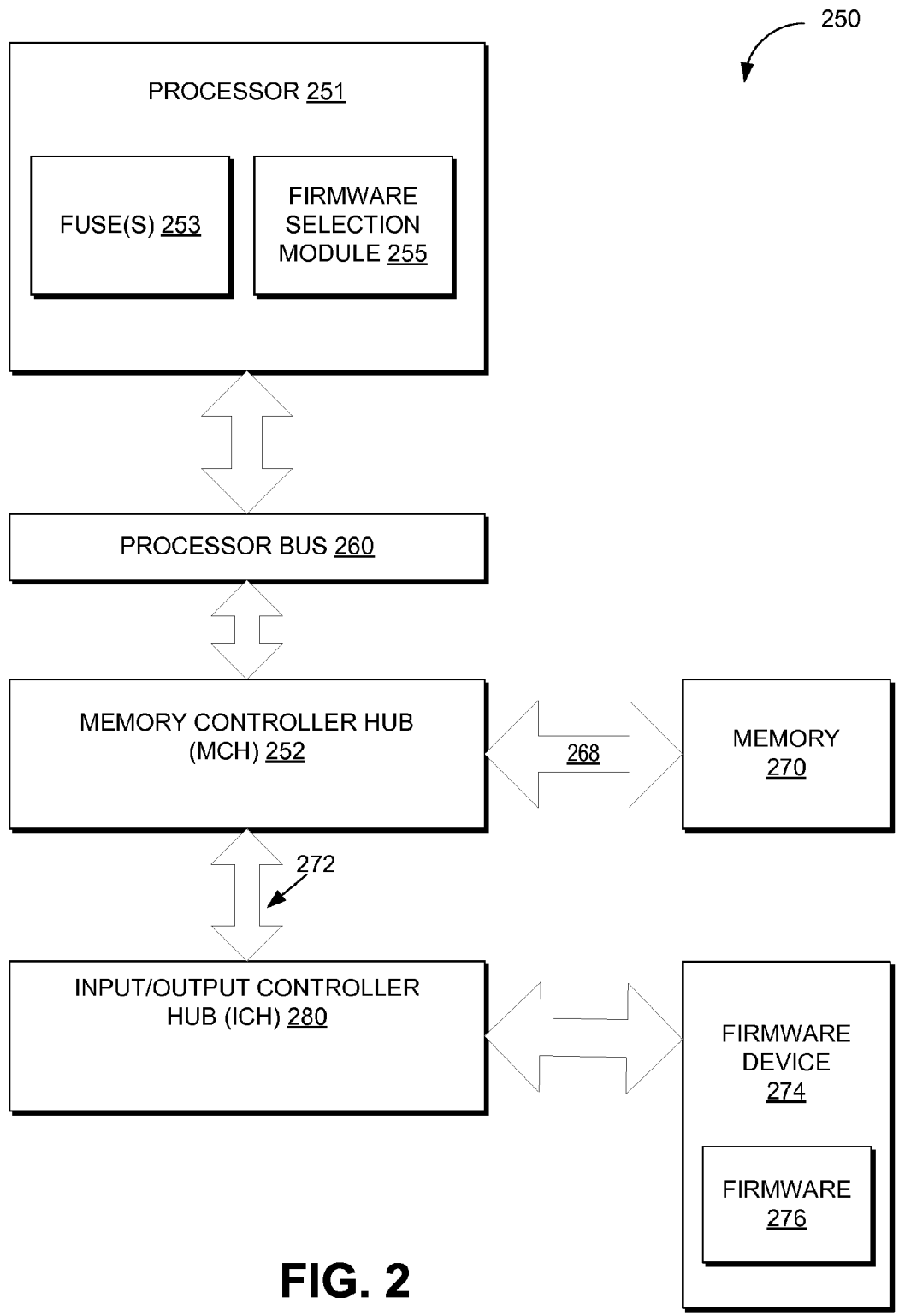
FIG. 2 is a block diagram of one embodiment of a system for selecting a runtime firmware.

Turning to FIG. 2, a block diagram of an exemplary computer system formed with a processor that includes execution units to execute an instruction, where one or more of the interconnects implement one or more features in accordance with one embodiment of the present disclosure is illustrated. System 250 includes a component, such as a processor 251 to employ execution units including logic to perform algorithms for process data, in accordance with the embodiment described herein. System 250 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 250 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments of the present disclosure can be used in handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 251 includes one or more execution units to implement an algorithm that is to perform at least one instruction. One embodiment may be described in the context of a single processor desktop or server system, but alternative embodiments may be included in a multiprocessor system. System 100 is an example of a 'hub' system architecture. The processor 251, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 251 is coupled to a processor bus 260 that transmits data signals between the processor 251 and other components in the system 250.

Memory 270 includes a dynamic random access memory (DRAM) device, a static random access memory (SRAM) device, flash memory device, or other memory device. Memory 270 stores instructions and/or data represented by data signals that are to be executed by the processor 251.

A system logic chip 252 is coupled to the processor bus 260 and memory 270. The system logic chip 252 in the illustrated embodiment is a memory controller hub (MCH). The processor 251 can communicate to the MCH 252 via a processor bus 260. The MCH 252 provides a high bandwidth memory path 268 to memory 270 for instruction and data storage and for storage of graphics commands, data and textures. The MCH 252 is to direct data signals between the processor 251, memory 270, and other components in the system 250 and to bridge the data signals between processor bus 260, memory 270, and system I/O bus 272.

System 250 uses a proprietary hub interface bus 272 to couple the MCH 252 to the I/O controller hub (ICH) 280. The ICH 280 provides direct connections to some I/O devices via a local I/O bus. The local I/O bus is a high-speed I/O bus for connecting peripherals (e.g., firmware device 274) to the memory 270, chipset, and processor 251. The firmware device 274 can comprise a hard disk drive, a floppy disk drive, a CD-ROM device, a flash memory device, or other mass storage device, that stores firmware 276. In certain embodiments, firmware 276 can be stored in a protected section of the firmware device (not shown), such as a local or shared SRAM, and/or in a memory segment referred to as a Replay Protected Memory Block (RPMB).

The processor 251 can include a firmware selection module 255. The firmware selection module can enable the secure boot of system 250 from multiple firmware sources or devices. For example, firmware selection module can enable system 250 to bring runtime firmware and/or soft straps from sources such as embedded MultiMediaCard (eMMC), Mobile Express, Universal Flash Storage (UFS), Universal Serial Bus (USB) and Serial Peripheral Interface (SPI). In doing so, a single processing device can be configured for use with any number of different types of IO/FLASH (and other)

technologies. The selection of firmware source/device can be performed on the first configuration boot via in-field programmable (IFP) fuses. Such fuses can be programmed in a production flow, such as by an OEM. In certain implementations, the first configuration boot can be configured to use USB as the default configuration method, employing the download and execute (DnX) flow. Doing so can provide access to certain fuses that can determine the firmware source/device selection to use for subsequent boots. In certain embodiments, the technologies presented in this disclosure can include changes to the reset sequence, which can be implemented via hardware and firmware.

In certain embodiments, during the reset sequence of system 250, a boot operation can start from a Power Management Control (PMC) block (not shown) on the 10 Subsystem (also known as 'South Complex'), using an internal ROM. In doing so, sufficient support can be implemented such that the system is ready to request the firmware selection module, such as Converge Security Engine (CSE), which, in turn, can bring a runtime firmware for the system from an external source such as a firmware device. Examples of such firmware devices include eMMC, UFS, USB and SPI. Accordingly, depending on the particular implementation, the CSE can be provisioned with enough ROM content (e.g., drivers and sequences) to be able to initiate such firmware devices (eMMC, USB, UFS, etc.), read their contents, and store such contents in memory such as in SoC local SRAMs. In doing so, the CSE can ensure that the configuration of the referenced boot source/device is performed on a secure manner (e.g., only after the correct access key and/or passcodes have been provided).

Processor 251 can also include one or more fuse(s) 253, such as in-field programmable (IFP) fuses, as referenced above. Such fuses can be used to facilitate a selection of the firmware device from which a firmware can be requested. In certain embodiments, the CSE can be configured to control an IFP fuse configuration sequence. Moreover, in certain embodiments an RPMB key can be generated based on the configuration of the fuse(s), and such a key can be used to access the protected section of a firmware device (such as a RPMB).

In certain embodiments, the PMC can be configured to bring devices as required or requested by the CSE in order to perform firmware and softstrap download and/or authentication of the contents once they are stored in local SRAMs. Once such contents are verified, the CSE can make them available by placing them in a SoC shared SRAM.

Figure 3A:
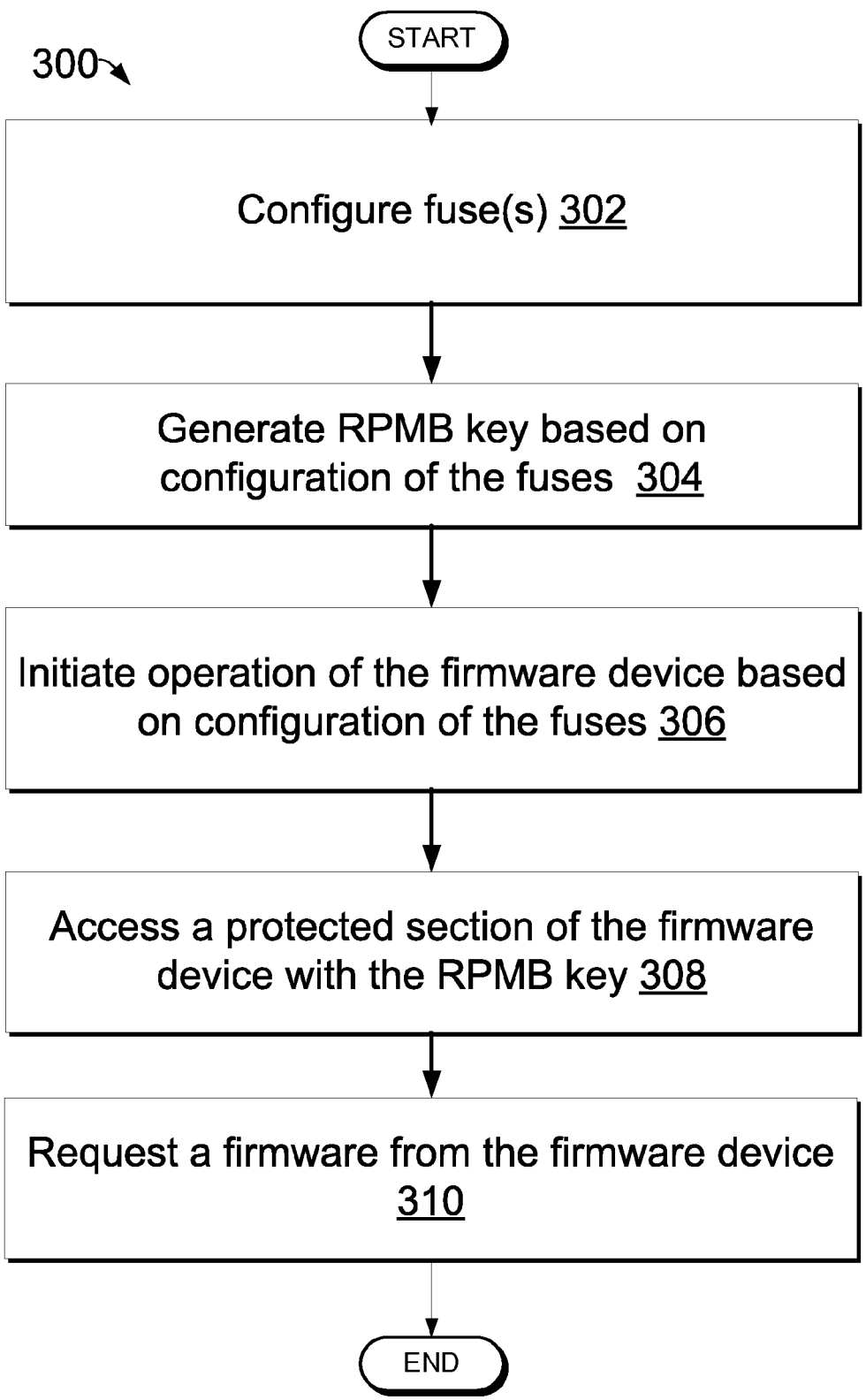
FIG. 3A is a flow diagram illustrating a method for selecting a runtime firmware according to an embodiment.

FIG. 3A is a flow diagram of method 300 for selecting a runtime firmware according to some embodiments. Method 300 may be performed by processing logic that may comprise hardware (e.g., circuitry, dedicated logic, programmable logic, microcode, etc.), software (such as instructions run on a processing device), firmware or a combination thereof. In one embodiment, method 300 is performed by a firmware selection module 255 of FIG. 2. In certain implementations the firmware selection module can utilize the same interface (s) referenced above and can provide exclusive access to the PMC or CSE during this time. Doing so can ensure that no conflicts arise during this time Referring to FIG. 3A, the method 300 begins by the processing logic configuring at least one of the one or more fuses (block 302). For example, the configuration of the at least one of the one or more fuses can include a configuration of the at least one of the one or more fuses that corresponds to a firmware device. In certain implementations the referenced configuration can be performed using the DnX flow referenced above and can be granted by CSE after the necessary access/authentication keys have been provided. The processing logic generates, based on the configuration of the one or more fuses, a Replay Protected Memory Block (RPMB) key (block 304). The processing logic initiates, based on a configuration of the at least one of the one or more fuses, operation of the firmware device (block 306). At block 308, the processing logic can access, with the RPMB key, a protected section of the firmware device, the protected section containing the firmware (306). The processing logic requests a firmware from the firmware device (310), and the method 300 ends.

FIGS. 3B-E are flow diagrams of various additional aspects of method(s) for selecting a runtime firmware according to some embodiments. Such method(s) may be performed by processing logic that may comprise hardware (e.g., circuitry, dedicated logic, programmable logic, microcode, etc.), software (such as instructions run on a processing device), firmware or a combination thereof. In certain embodiments, such methods can be performed by a firmware selection module 255 of FIG. 2. It should also be noted that FIGS. 3B-E depict various locations where particular aspects or operations of the method(s) can be performed (e.g., External, PMC, CSE, and Host).

Figure 3B:
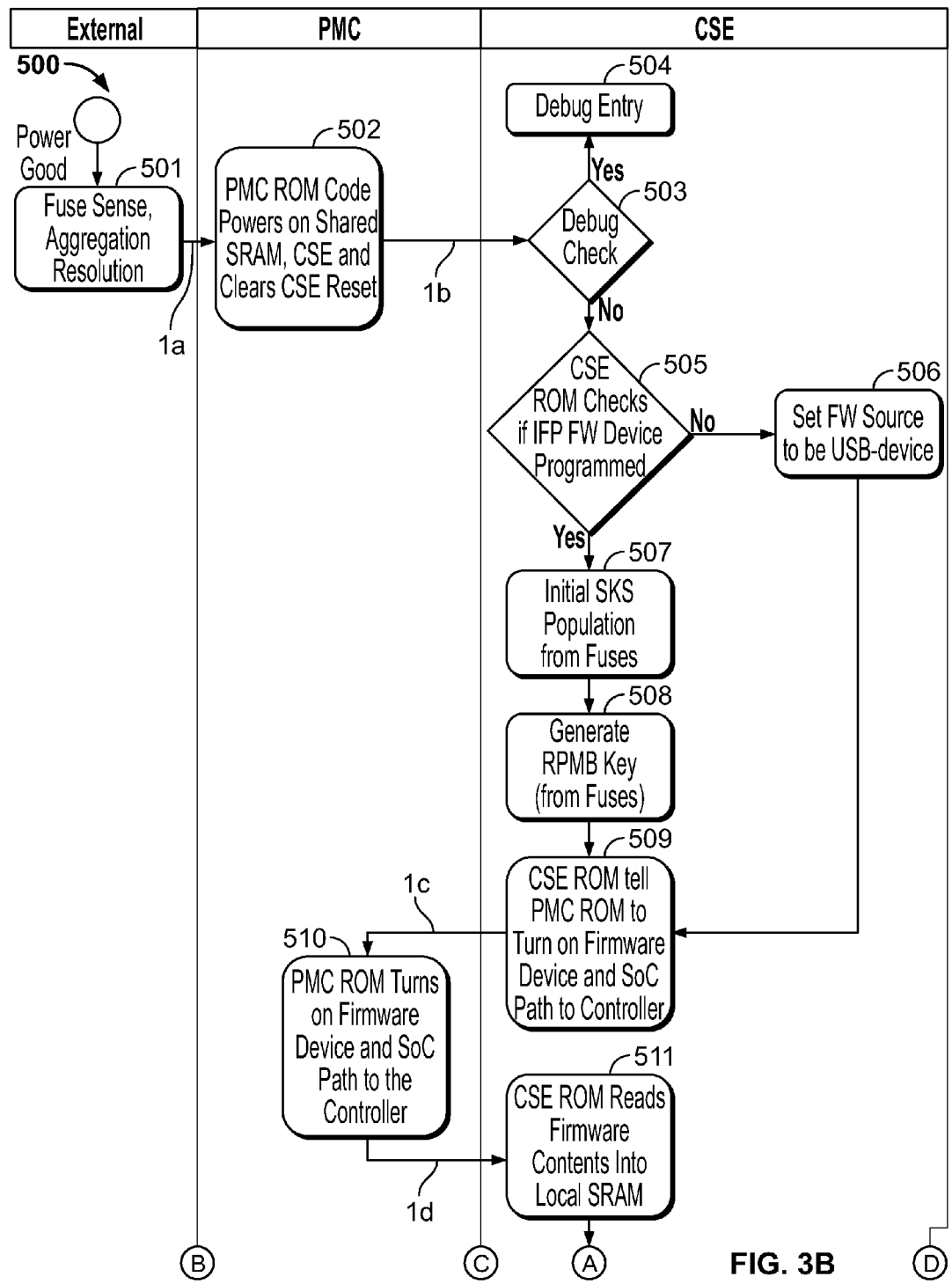
FIG. 3B is a flow diagram illustrating a method for selecting a runtime firmware according to an embodiment.
Figure 3B:
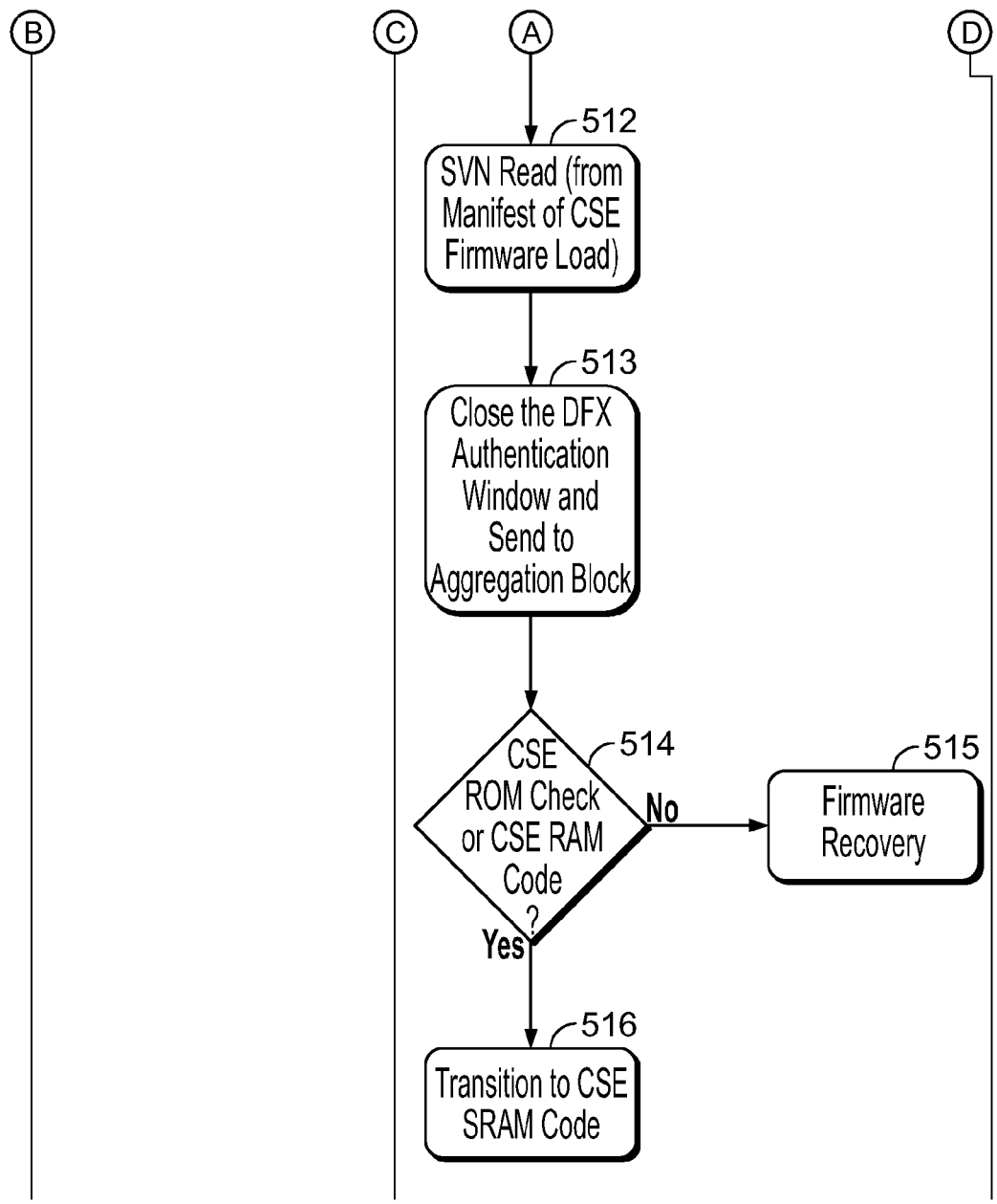

Referring to FIG. 3B, in method 500 an aggregation block can send the fuse sense/strap values to the PMC and/or the CSE (501). The CSE can have a ROM bypass (to SPI) mode for early debug. PMC ROM code can power on shared SRAM and CSE and can clear CSE reset (502). In certain implementations these options could be turned on by default modulo any current surge concerns. There can also be a bit (referred to as a 'chicken bit') that can cause the PMC to be bypassed and the CSE to be utilized directly. A debug check can be performed (503) and a debug entry (504) can occur. Alternatively, CSE ROM can check if IFP firmware device is programmed (505). It should be understood that IFP fuse can set the firmware source. For first time flashing and firmware recovery, firmware source is set to USB-device. Firmware can be loaded via USB. The non-volatile memory (NVM) can then be programmed by iA in a provisioning OS. Based on the check, the firmware source can be set to a USB-device (506), or, alternatively, initial secure key storage can be populated from the fuses (that is, from fuses that contain keys that the CSE uses) (507). RPMB key(s) can be generated (from fuses) (508), and CSE ROM can instruct PMC ROM to initiate the firmware device and SoC path to controller (509). PMC ROM can turn on the firmware device and SoC path to the controller (510). CSE ROM reads firmware contents into local SRAM (511). Such contents can include battery thresholds and necessary headers for crypto hashes and SVT. Key hashes are stored in the fuses referenced above. It should be noted that debug can optionally have access to RPMB (also including the CSE ROM patches). SVN can be read (such as from a manifest of CSE firmware load) (512). SVN can protect secure content from earlier firmware versions than are permitted by the SVT. A debug toolkit (DFX) Authentication Window can be closed and sent to aggregation block (513). The debug toolkit can control distribution of assets from the fuses (for example, by preventing distribution of some assets for devices that are being debugged). In certain implementations, this can be done from ROM code (thus eliminating the option of doing it in RAM). A determination can be made as to whether a CSE ROM or CSE RAM code is present (514), based on which firmware recovery can be initiated (515) or otherwise transitioned to CSE SRAM code (515), where ROM-based runtime support can continue to be used. In certain implementations, a jump table can be used to allow corrections for faulty ROM-based routines. Paging can also be used to remap 4K blocks of ROM to RAM if necessary.

Figure 3C:
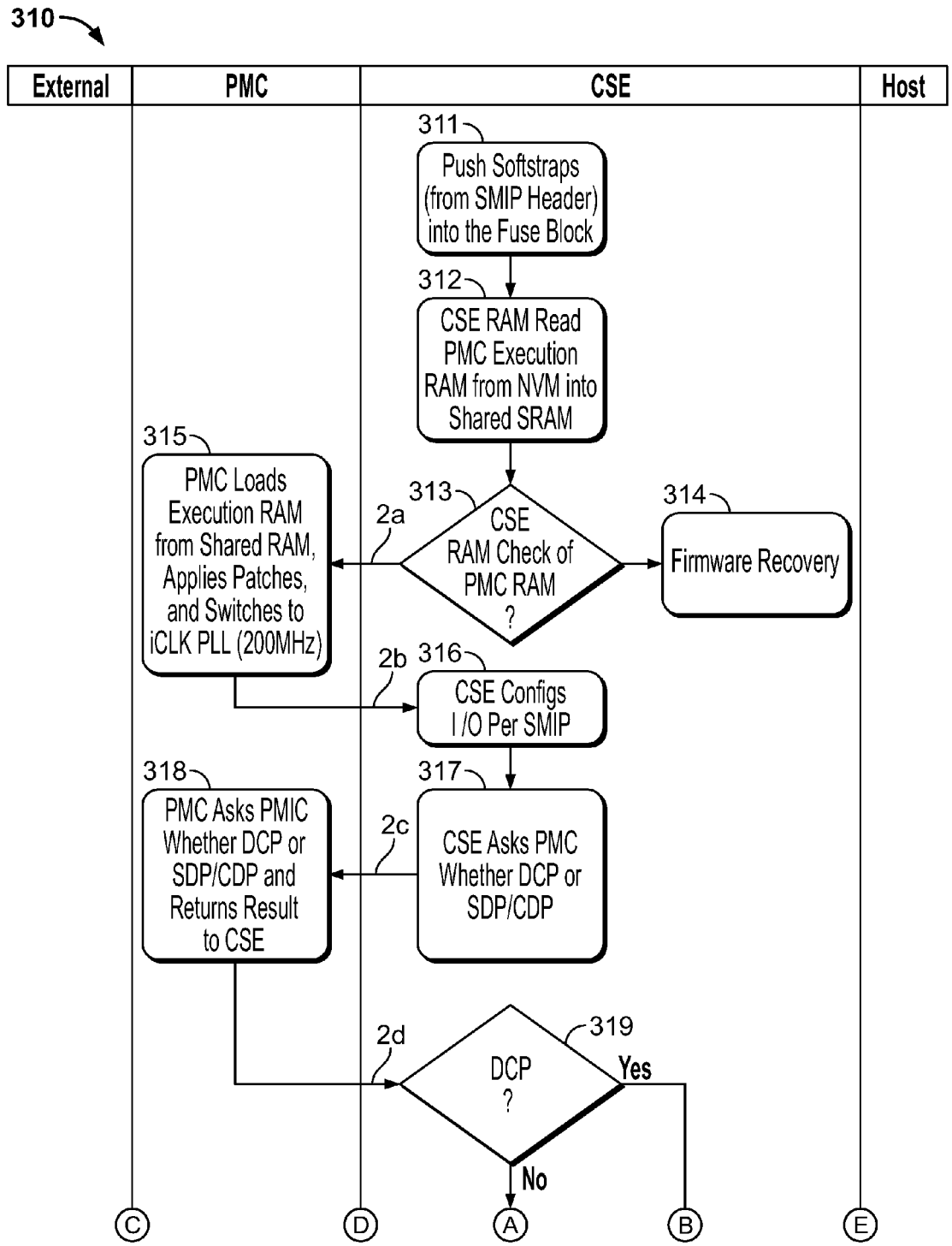
FIG. 3C is a flow diagram illustrating a method for selecting a runtime firmware according to an embodiment.
Figure 3C:
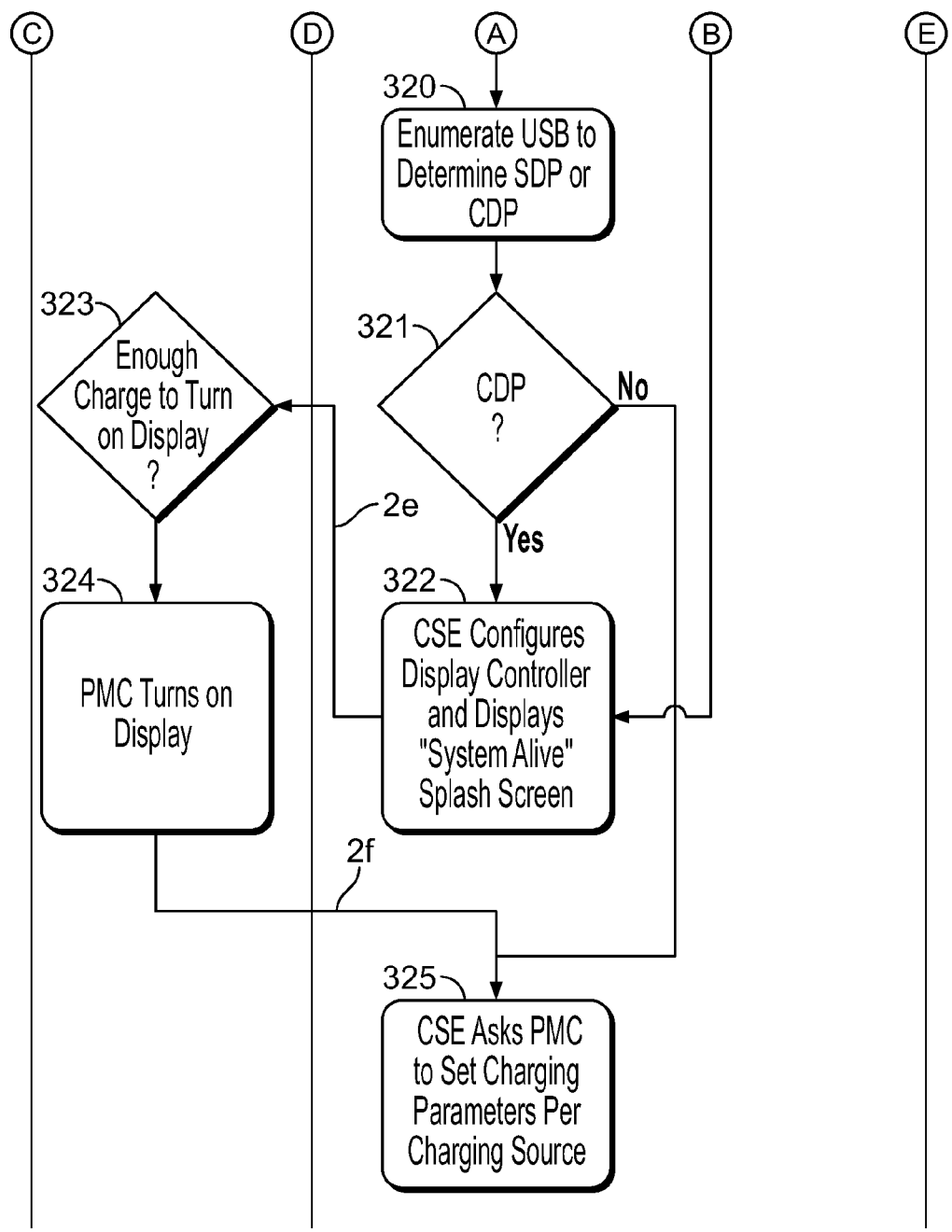

Referring to FIG. 3C, in method 310 softstraps can be pushed (such as from SMIP header) into the fuse block (311), thereby permitting fuse overrides. In certain implementations, this can be done before restarting PMC with RAM based code. Moreover, in certain implementations PMC RAM-based code can re-read fuses when it loads. CSE RAM can read PMC execution RAM from NVM into shared SRAM (312). In certain implementations, this can include the PMC ROM patches, such as for the run-time code that needs to be patched. The same techniques can be used as with the CSE ROM patches or can continue to use the existing event register technique. A determination can be made as to whether CSE RAM can perform a check of PMC RAM (313), based upon which firmware recovery can be initiated (314) or PMC can load execution RAM from shared RAM, apply patches, and switch to iCLK PLL (200 MHz) (315). CSE can configure I/O per SMIP (316). CSE can inquire from PMC whether DCP or SDP/CDP modes are used (317). PMC inquires from PMIC whether DCP or SDP/CDP are used and the returns result to CSE (318). Based on a determination as to whether DCP mode is used (319), if DCP mode is not used then USB can be enumerated to determine SDP or CDP (320). Based on a determination as to whether CDP mode is used (321), if CDP mode is used then CSE configures display controller and displays a "system alive" splash screen (322). "System alive" can be a temporary display to demonstrate life before a processor is brought up. It may display for a short time if battery isn't flat or a longer time if the battery is awaiting having enough charge to bring up the processor. For example, if only a 100 mA charger is present, it can be presumed that such is not a sufficient current to turn on the display. A determination is made as to whether enough charge is present to turn on the display (323), and the PMC can turn on the display (324). CSE can instruct PMC to set charging parameters per charging source (325).

Figure 3D:
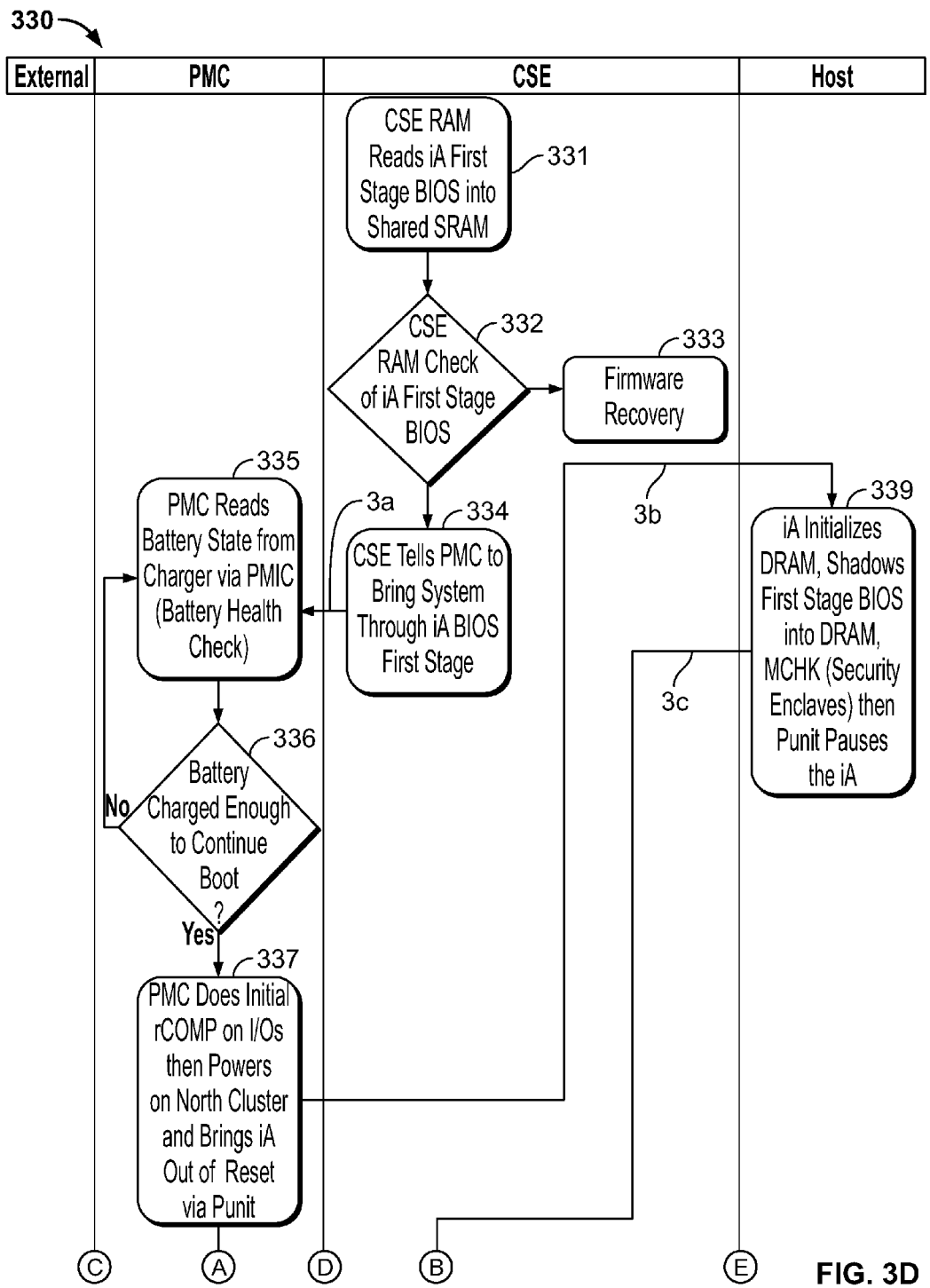
FIG. 3D is a flow diagram illustrating a method for selecting a runtime firmware according to an embodiment.
Figure 3D:
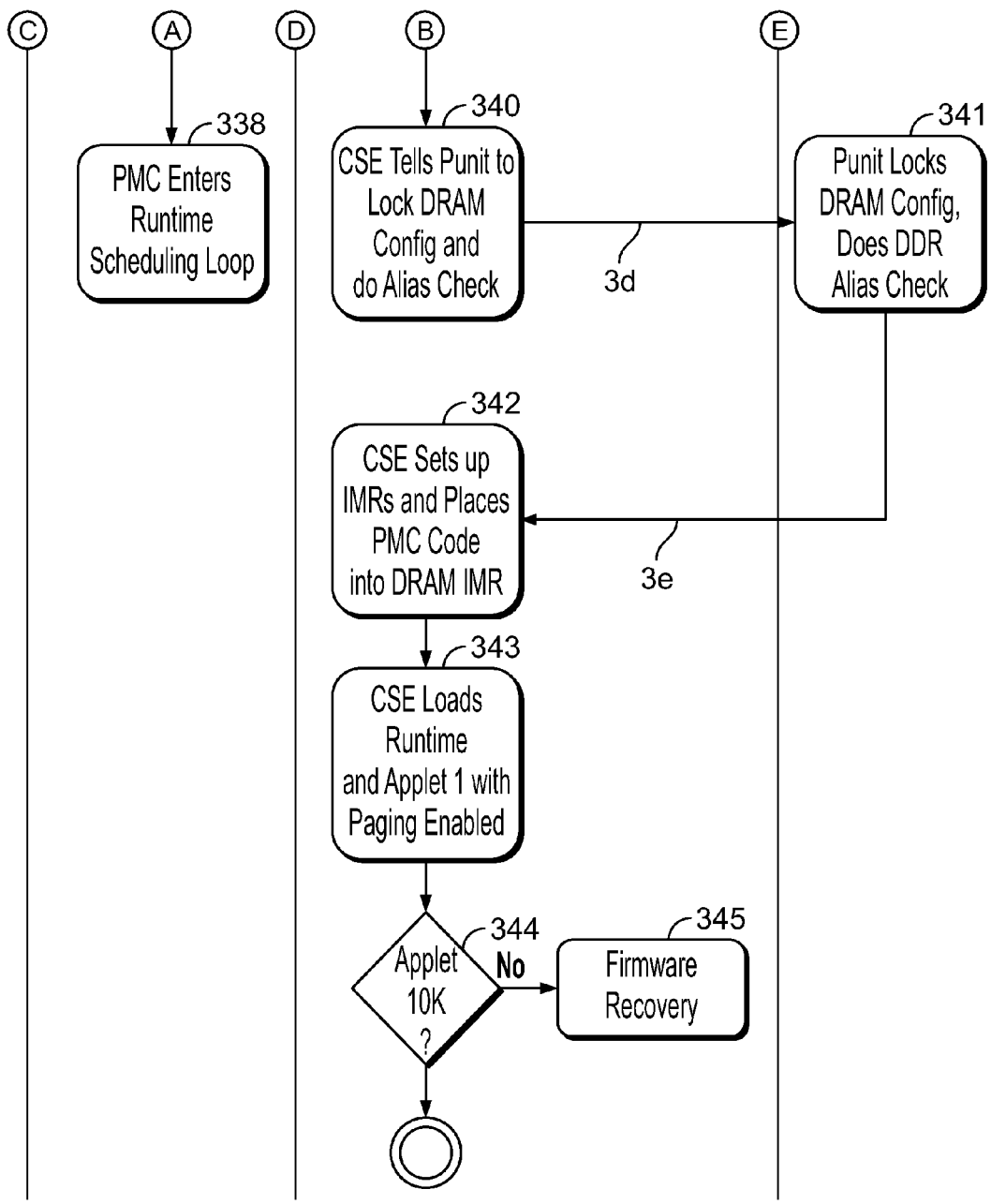

Referring to FIG. 3D, in method 330 CSE RAM can read an iA first stage BIOS into shared SRAM (331). CSE RAM can check iA first stage BIOS (332). Based on the check, firmware recovery can be initiated (333) or the CSE can instruct the PMC to bring system through the iA BIOS first stage (334). PMC can read battery state from charger via PMIC (battery health check) (335), based on which a determination can be made as to whether the battery is charged enough to continue boot (336). PMC can perform an initial rCOMP on I/Os and then can power on the North cluster and bring iA out of reset (337) and the PMC can enter a runtime scheduling loop (338). iA can initialize DRAM, shadow first stage BIOS into DRAM, run MCHK (security enclaves) then can pause the iA (339). CSE can instruct to lock DRAM config and perform an alias check (340). DRAM config can be locked and DDR alias check can be performed (341). CSE can set up IMRs and place PMC code into DRAM IMR (342). CSE loads runtime and an applet that validates firmware/software (BIOS stage 2, OS image, OS boot time firmware loads, etc.) with paging enabled (343). Based on a determination that the runtime and applet are operating properly (344), the process can end or firmware recovery can be initiated (345).

Figure 3E:
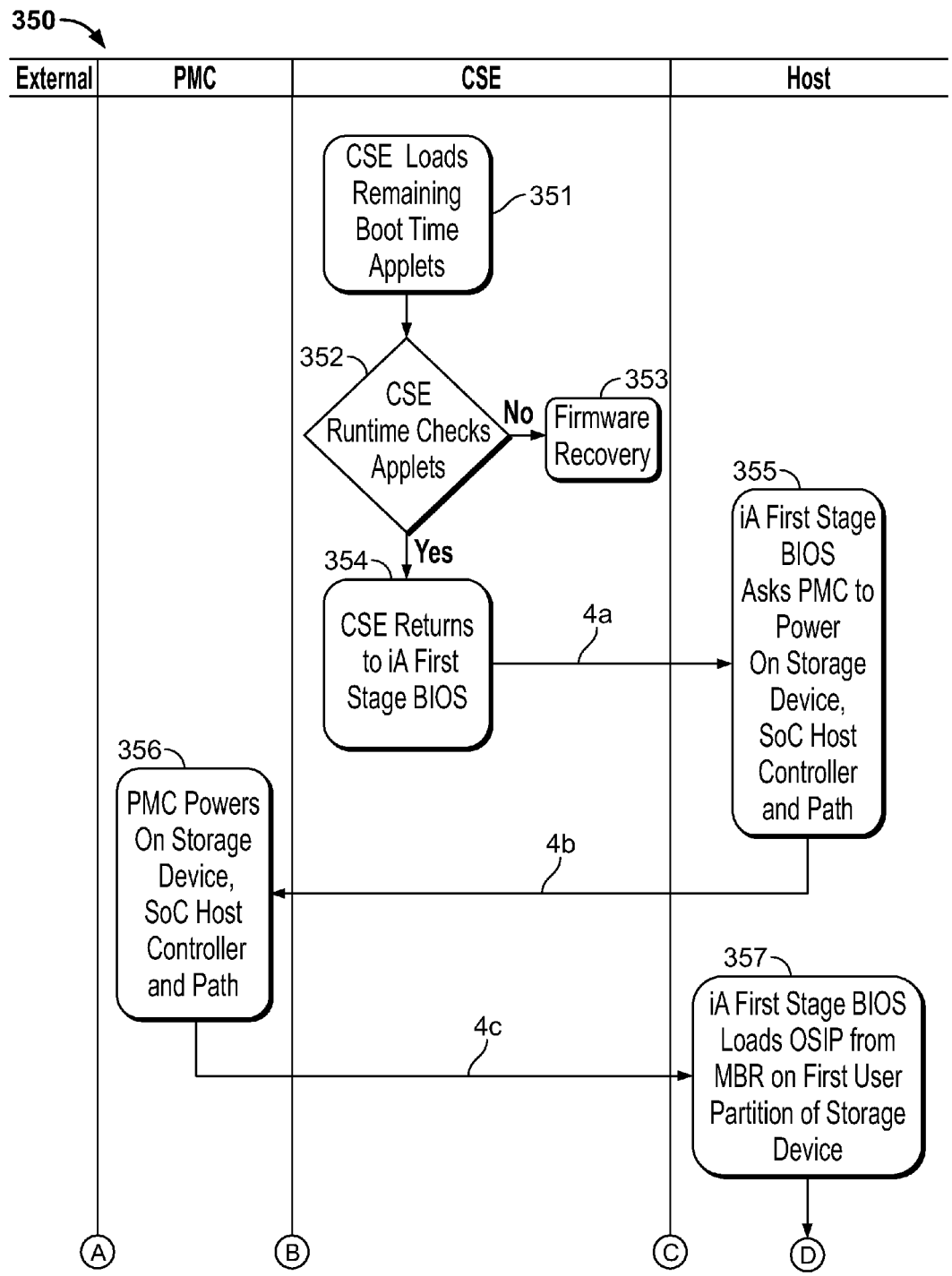
FIG. 3E is a flow diagram illustrating a method for selecting a runtime firmware according to an embodiment.
Figure 3E:
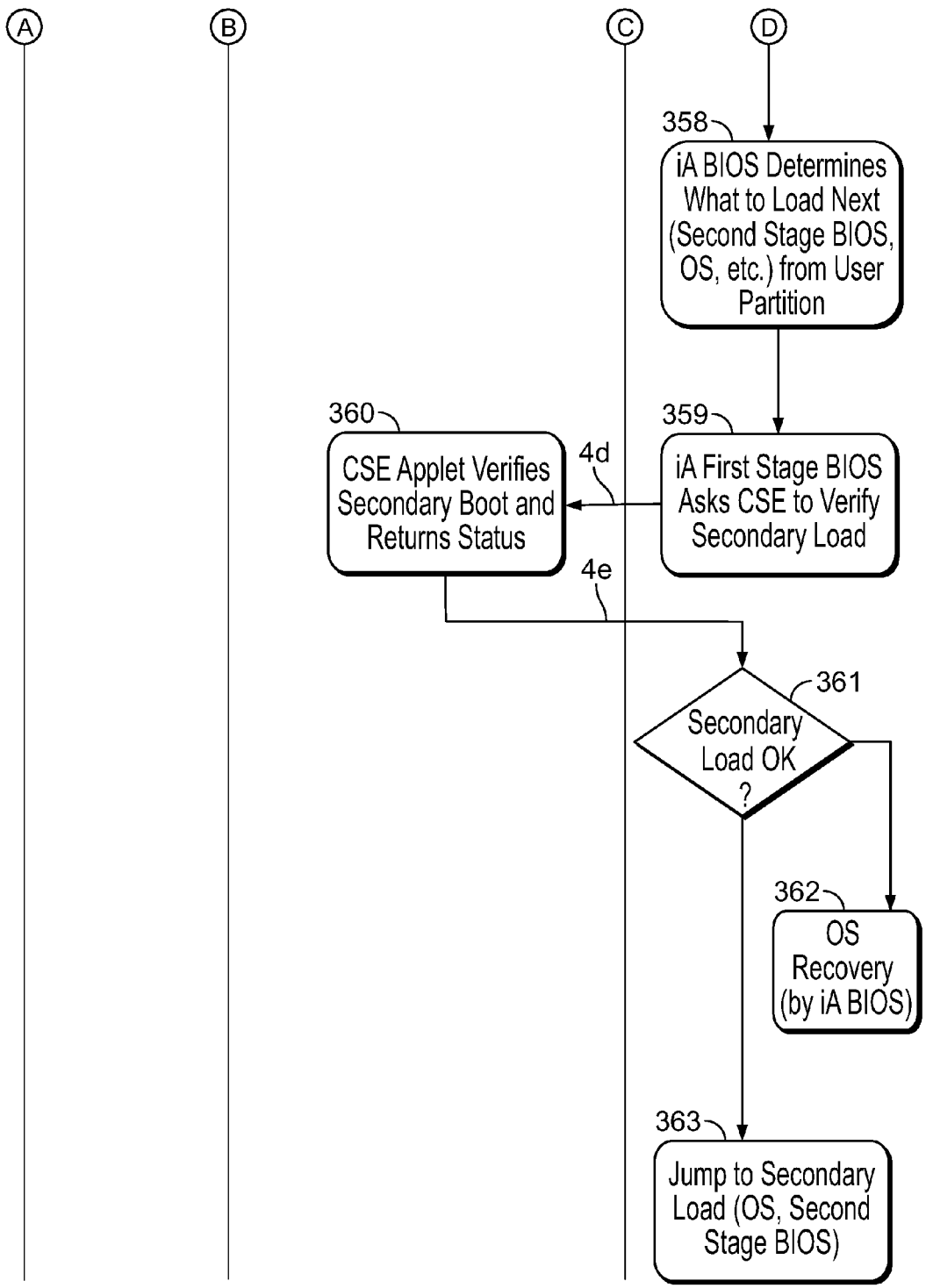

Referring to FIG. 3E, in method 350 CSE can loads remaining boot time applets (351). Examples of such applets include pre-OS applets that come off boot block, such as an OEM custom battery charging applet, the fTPM code, a Java virtual machine (JVM) along with Java persistent applets, and/or an antitheft applet. CSE runtime can check the applets (352), based on which firmware recovery can be initiated (353) or the CSE can return to iA first stage BIOS (354). iA first stage BIOS instructs PMC to power on a storage device, SoC host controller and path (such as for firmware on the SPI and storage on SATA) (355). PMC can then power on storage device, SoC host controller and path (356). iA first stage BIOS can load OSIP from MBR on a first user partition of storage device (such as the (eMMC defined) user partition in eMMC, the full disk in SATA, etc.) (357). iA BIOS determines what to load next (second stage BIOS, OS, etc.) from user partition (358). iA first stage BIOS can instruct CSE to verify secondary load (359). CSE applet can verify secondary boot and return status (including, in certain implementations, fTPM measurement) (360). Based on a determination that the secondary load was successful (361), OS recovery (by iA BIOS) can be initiated (362) or the secondary load (OS, second stage BIOS) can be initiated (363).

Figure 4:
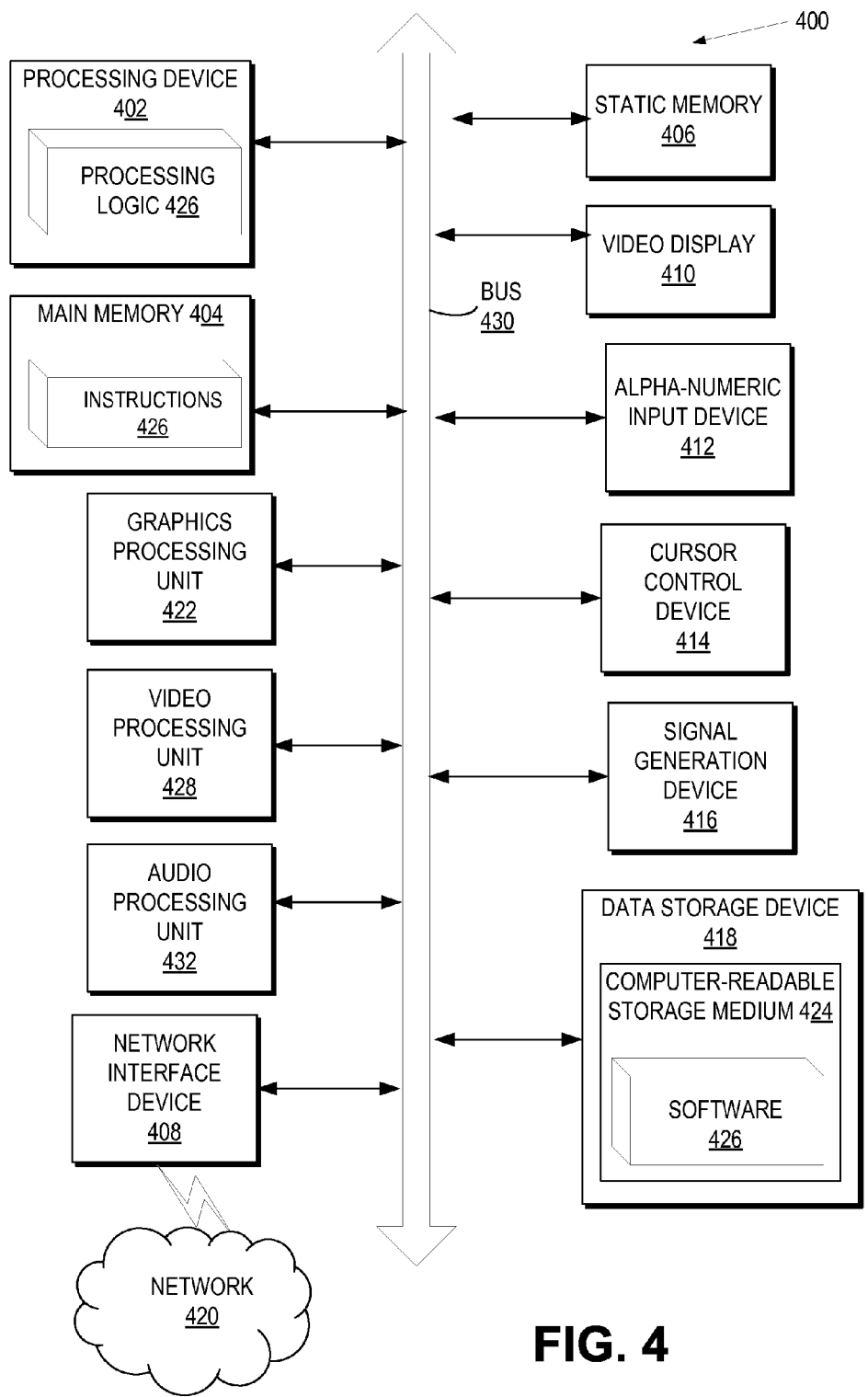
FIG. 4 illustrates a diagrammatic representation of a machine in the example form of a computer system within which a set of instructions, for causing the machine to perform any one or more of the methodologies discussed herein, may be executed.

FIG. 4 illustrates a representation of a machine in the example form of a computer system 500 within which a set of instructions, for causing the machine to perform any one or more of the methodologies discussed herein, including firmware selection, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 500 includes a processing device 502, a main memory 504 (e.g., read-only memory (ROM), flash memory, dynamic random access memory (DRAM) (such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. In one embodiment, processing device 502 may include one or processing cores. The processing device 502 is configured to execute the processing logic 526 for performing the operations discussed herein. In one embodiment, processing device 502 is the same as computing system 100 of FIG. 1A. In another embodiment, processing device 502 is the same as computing system 140 of FIG. 1B. In another embodiment, processing device 502 implements firmware selection module 255 of FIG. 2.

The computer system 500 may further include a network interface device 508 communicably coupled to a network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), a signal generation device 516 (e.g., a speaker), or other peripheral devices. Furthermore, computer system 500 may include a graphics processing unit 522, a video processing unit 528, and an audio processing unit 532. In another embodiment, the computer system 500 may include a chipset (not illustrated), which refers to a group of integrated circuits, or chips, that are designed to work with the processing device 502 and controls communications between the processing device 502 and external devices. For example, the chipset may be a set of chips on a motherboard that links the processing device 502 to very high-speed devices, such as main memory 504 and graphic controllers, as well as linking the processing device 502 to lower-speed peripheral buses of peripherals, such as USB, PCI or ISA buses.

The data storage device 518 may include a computer-readable storage medium 524 on which is stored software 526 embodying any one or more of the methodologies of functions described herein. The software 526 may also reside, completely or at least partially, within the main memory 504 as instructions 526 and/or within the processing device 502 as processing logic 526 during execution thereof by the computer system 500; the main memory 504 and the processing device 502 also constituting computer-readable storage media.

The computer-readable storage medium 524 may also be used to store instructions 526 utilizing the firmware selection module, such as described with respect to FIGS. 1A-E and FIG. 2, and/or a software library containing methods that call the above applications. While the computer-readable storage medium 524 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

Figure 5:
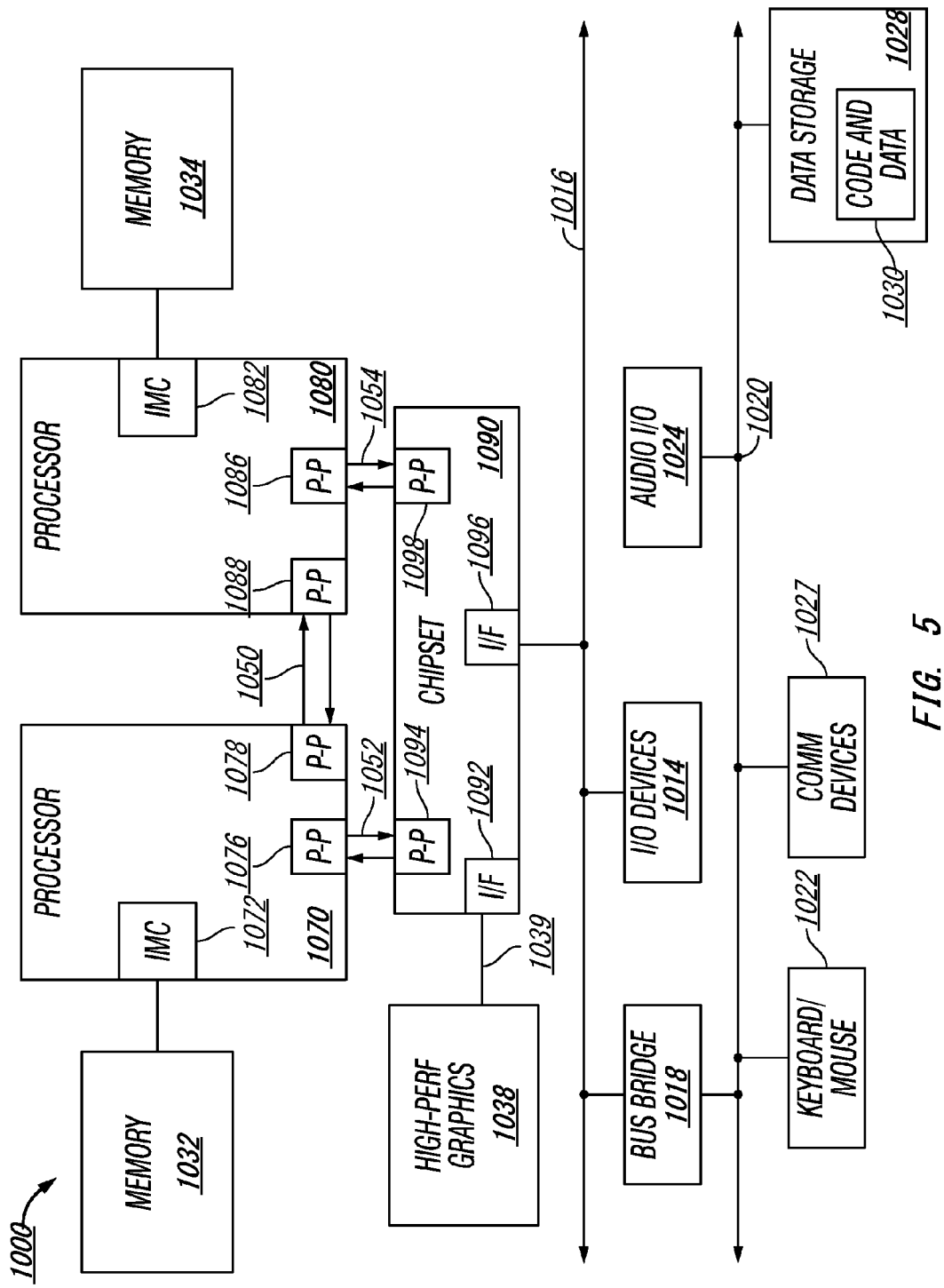
FIG. 5 is a block diagram of a computer system according to one embodiment.

Referring now to FIG. 5, shown is a block diagram of a second system 1000 in accordance with an embodiment of the present disclosure. As shown in FIG. 5, multiprocessor system 1000 is a point-to-point interconnect system, and includes a first processor 1070 and a second processor 1080 coupled via a point-to-point interconnect 1050. Each of processors 1070 and 1080 may be some version of the computing systems described herein, such as for performing firmware selection.

While shown with two processors 1070, 1080, it is to be understood that the scope of the present disclosure is not so limited. In other embodiments, one or more additional processors may be present in a given processor.

Processors 1070 and 1080 are shown including integrated memory controller units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 5, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, 1098. Chipset 1090 may also exchange information with a high-performance graphics circuit 1038 via a high-performance graphics interface 1039.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present disclosure is not so limited.

As shown in FIG. 5, various I/O devices 1014 may be coupled to first bus 1016, along with a bus bridge 1018 which couples first bus 1016 to a second bus 1020. In one embodiment, second bus 1020 may be a low pin count (LPC) bus. Various devices may be coupled to second bus 1020 including, for example, a keyboard and/or mouse 1022, communication devices 1027 and a storage unit 1028 such as a disk drive or other mass storage device which may include instructions/code and data 1030, in one embodiment. Further, an audio I/O 1024 may be coupled to second bus 1020. Note that other architectures are possible. For example, instead of the point-to-point architecture of FIG. 5, a system may implement a multi-drop bus or other such architecture.

Referring now to FIG. 6, shown is a block diagram of a third system 1100 in accordance with an embodiment of the present disclosure. Like elements in FIGS. 5 and 6 bear like reference numerals, and certain aspects of FIG. 5 have been omitted from FIG. 6 in order to avoid obscuring other aspects of FIG. 6.

FIG. 6 illustrates that the processors 1170, 1180 may include integrated memory and I/O control logic ("CL") 1172 and 1182, respectively. For at least one embodiment, the CL 1172, 1182 may include integrated memory controller units such as that described above in connection with FIG. 5. In addition. CL 1172, 1182 may also include I/O control logic. FIG. 6 illustrates that the memories 1132, 1134 are coupled to the CL 1172, 1182, and that I/O devices 1114 are also coupled to the control logic 1172, 1182. Legacy I/O devices 1115 are coupled to the chipset 1190.

The following examples pertain to further embodiments.

Example 1 is an apparatus for selecting a runtime firmware, the apparatus comprising: 1) a firmware device; and 2) a processing device coupled to the firmware device, the processing device having one or more fuses and being configured to: configure at least one of the one or more fuses; initiate, based on a configuration of the at least one of the one or more fuses, operation of the firmware device; and request a firmware from the firmware device.

In Example 2, the processing device of Example 1 is optionally further configured to: generate, based on the configuration of the one or more fuses, a Replay Protected Memory Block (RPMB) key.

In Example 3, the processing device of Example 2 is optionally further configured to: access, with the RPMB key, a protected section of the firmware device, the protected section containing the firmware.

In Example 5, the configuration of the at least one of the one or more fuses of Example 1 can optionally comprise a configuration of the at least one of the one or more fuses that corresponds to the firmware device.

In Example 5, the firmware device of Example 1 can optionally comprise a memory.

In Example 6, the firmware device of Example 1 can optionally comprise a flash memory.

Various embodiments may have different combinations of the operational features described above. For instance, all optional features of the apparatus described above may also be implemented with respect to the method or process described herein and specifics in the examples may be used anywhere in one or more embodiments.

Example 7 is a method for selecting a runtime firmware, the method comprising: 1) configuring at least one of one or more fuses of a processing device; 2) initiating, based on a configuration of the at least one of the one or more fuses, operation of a firmware device; and 3) requesting a firmware from the firmware device.

In Example 8, the method of Example 7 can further comprise generating, based on the configuration of the one or more fuses, a Replay Protected Memory Block (RPMB) key.

In Example 9, the method of Example 8 can further comprise: accessing, with the RPMB key, a protected section of the firmware device, the protected section containing the firmware.

In Example 10, the configuration of the at least one of the one or more fuses of Example 7 can optionally comprise a configuration of the at least one of the one or more fuses that corresponds to the firmware device.

In Example 11, the firmware device of the method of Example 7 can optionally comprise a memory.

In Example 12, the firmware device of the method of Example 7 can optionally comprise a flash memory.

Various embodiments may have different combinations of the operational features described above. For instance, all optional features of the method described above may also be implemented with respect to a non-transitory, computer-readable storage medium. Specifics in the examples may be used anywhere in one or more embodiments.

Example 13 is a non-transitory, computer-readable storage medium including instructions that, when executed by a computing system, cause the computing system to perform the method of Examples 7-12.

Example 14 is a system for selecting a runtime firmware, the system comprising: 1) a firmware device; and 2) a processor coupled to the firmware device, the processor having one or more fuses and being configured to: configure at least one of the one or more fuses; initiate, based on a configuration of the at least one of the one or more fuses, operation of the firmware device; and request a firmware from the firmware device.

In Example 15, the processor of Example 14 is optionally further configured to: generate, based on the configuration of the one or more fuses, a Replay Protected Memory Block (RPMB) key.

In Example 16, the processor of Example 15 is optionally further configured to: access, with the RPMB key, a protected section of the firmware device, the protected section containing the firmware.

In Example 17, the configuration of the at least one of the one or more fuses of Example 14 can optionally comprise a configuration of the at least one of the one or more fuses that corresponds to the firmware device.

In Example 18, the firmware device of Example 14 can optionally comprise a memory.

In Example 19, the firmware device of Example 14 can optionally comprise a flash memory.

Example 20 is an apparatus for selecting a runtime firmware, the apparatus comprising: 1) means for configuring at least one of one or more fuses of a processing device; 2) means for initiating, based on a configuration of the at least one of the one or more fuses, operation of a firmware device; and 3) means for requesting a firmware from the firmware device.

In Example 21, the subject matter of Example 20 can optionally further comprise means for generating, based on the configuration of the one or more fuses, a Replay Protected Memory Block (RPMB) key.

In Example 22, the subject matter of Example 21 can optionally further comprise: means for accessing, with the RPMB key, a protected section of the firmware device, the protected section containing the firmware.

In Example 23, the configuration of the at least one of the one or more fuses of Example 20 can optionally comprise a configuration of the at least one of the one or more fuses that corresponds to the firmware device.

In Example 24, the firmware device of Example 20 can optionally comprise a memory.

In Example 25, the firmware device of Example 20 can optionally comprise a flash memory.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "configuring," "initiating," "requesting," "generating," "accessing," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An apparatus for selecting a runtime firmware, the apparatus comprising:
   a firmware device; and
   a processing device coupled to the firmware device, the processing device having one or more fuses, wherein the processing device is to:
      configure at least one of the one or more fuses in accordance with a fuse configuration sequence that corresponds to the firmware device;
      generate, based on a configuration of the one or more fuses in accordance with the fuse configuration sequence, a Replay Protected Memory Block (RPMB) key;
      initiate, based on the configuration of the at least one of the one or more fuses, operation of the firmware device; and
      request, with the RPMB key, a firmware from the firmware device.

2. The apparatus of claim 1, wherein the processing device is further to:
   access, with the RPMB key, a protected section of the firmware device, the protected section containing the firmware.

3. The apparatus of claim 1, wherein the configuration of the at least one of the one or more fuses comprises a configuration of the at least one of the one or more fuses that corresponds to the firmware device.

4. The apparatus of claim 1, wherein the firmware device comprises a memory.

5. The apparatus of claim 1, wherein the firmware device comprises a flash memory.

6. A method for selecting a runtime firmware, the method comprising:
   configuring at least one of one or more fuses of a processing device in accordance with a fuse configuration sequence that corresponds to a firmware device;
   generating, based on a configuration of the one or more fuses in accordance with the fuse configuration sequence, a Replay Protected Memory Block (RPMB) key;
   initiating, based on a configuration of the at least one of the one or more fuses, operation of the firmware device; and
   requesting, with the RPMB key, a firmware from the firmware device.

7. The method of claim 6, further comprising:
   accessing, with the RPMB key, a protected section of the firmware device, the protected section containing the firmware.

8. The method of claim 6, wherein the configuration of the at least one of the one or more fuses comprises a configuration of the at least one of the one or more fuses that corresponds to the firmware device.

9. The method of claim 6, wherein the firmware device comprises a memory.

10. The method of claim 6, wherein the firmware device comprises a flash memory.

11. A non-transitory, computer-readable storage medium including instructions that, when executed by a computing system, cause the computing system to:
   configure at least one of one or more fuses of a processing device in accordance with a fuse configuration sequence that corresponds to a firmware device;
   generate, based on a configuration of the one or more fuses in accordance with the fuse configuration sequence, a Replay Protected Memory Block (RPMB) key;
   initiate, based on a configuration of the at least one of the one or more fuses, operation of the firmware device; and
   request, with the RPMB key, a firmware from the firmware device.

12. The storage medium 11, further comprising instructions that, when executed by a computing system, cause the computing system to:
   access, with the RPMB key, a protected section of the firmware device, the protected section containing the firmware.

13. The storage medium of claim 11, wherein the configuration of the at least one of the one or more fuses comprises a configuration of the at least one of the one or more fuses that corresponds to the firmware device.

14. The storage medium of claim 11, wherein the firmware device comprises a memory.

15. The storage medium of claim 11, wherein the firmware device comprises a flash memory.

16. A system for selecting a runtime firmware, the system comprising:
   a firmware device; and
   a processor coupled to the firmware device, the processor having one or more fuses, wherein the processor is to:
      configure at least one of the one or more fuses in accordance with a fuse configuration sequence that corresponds to the firmware device;
      generate, based on a configuration of the one or more fuses in accordance with the fuse configuration sequence, a Replay Protected Memory Block (RPMB) key;
      initiate, based on a configuration of the at least one of the one or more fuses, operation of the firmware device; and
      request, with the RPMB key, a firmware from the firmware device.

17. The system of claim 16, wherein the processor is further to:
   access, with the RPMB key, a protected section of the firmware device, the protected section containing the firmware.

18. The system of claim 16, wherein the configuration of the at least one of the one or more fuses comprises a configuration of the at least one of the one or more fuses that corresponds to the firmware device.

19. The system of claim 16, wherein the firmware device comprises a memory.

20. The system of claim 16, wherein the firmware device comprises a flash memory.

* * * * *